(12) United States Patent
Ortiz

(10) Patent No.: US 7,513,515 B1
(45) Date of Patent: Apr. 7, 2009

(54) STRUT BAR

(75) Inventor: Victor Ortiz, San Diego, CA (US)

(73) Assignee: Victor O Design, LLC, Bonita, CA (US)

( * ) Notice: Subject to any disclaimer, the term of this patent is extended or adjusted under 35 U.S.C. 154(b) by 305 days.

(21) Appl. No.: 11/530,642

(22) Filed: Sep. 11, 2006

(51) Int. Cl.
*B60G 21/055* (2006.01)

(52) U.S. Cl. .................. 280/124.107; 280/124.147; 280/124.152

(58) Field of Classification Search .......... 280/124.106, 280/124.107, 124.145, 124.147, 124.152, 280/124.146
See application file for complete search history.

(56) References Cited

U.S. PATENT DOCUMENTS

| | | | |
|---|---|---|---|
| 1,651,292 A * | 11/1927 | Ramage | 180/313 |
| 3,244,251 A * | 4/1966 | Duncan | 280/756 |
| 5,042,835 A * | 8/1991 | Burns | 280/756 |
| D372,446 S * | 8/1996 | Hotchkis, Jr. | D12/159 |
| 5,848,715 A * | 12/1998 | Duncan | 212/180 |
| 6,099,004 A * | 8/2000 | Lin | 280/124.107 |
| 6,244,607 B1 * | 6/2001 | Nishino | 280/124.107 |
| 7,328,909 B2 * | 2/2008 | Takayanagi et al. | 280/124.106 |
| 7,404,596 B2 * | 7/2008 | Miyata et al. | 296/203.02 |
| 2007/0246971 A1 * | 10/2007 | Hanakawa et al. | 296/203.01 |

* cited by examiner

*Primary Examiner*—Paul N. Dickson
*Assistant Examiner*—Drew J. Brown
(74) *Attorney, Agent, or Firm*—Frank G. Morkunas

(57) ABSTRACT

A strut bar having single or multi-cross member each with downward diagonally disposed extensions terminating at a pivot point and a mounting member. The mounting members are adapted to fit directly over existing shock towers and strut towers using the studs of each respective tower. A diagonally disposed support brace is connected to the cross members and to the downward extensions according greater structural support.

8 Claims, 4 Drawing Sheets

STRUT BAR

CROSS REFERENCES TO RELATED APPLICATIONS

None.

STATEMENT REGARDING FEDERALLY-SPONSORED RESEARCH OR DEVELOPMENT

Not applicable.

BACKGROUND

This strut bar of this disclosure relates to an improvement in strut bars, and more particularly to strut bars for trucks with low-seated shock towers and low-seated strut towers.

One of the most common upgrades on a modified car is mounting strut bars. A strut bar (also known as strut tower bar or strut brace) is designed to tie the two opposing strut towers together as a single solid unit. The purpose of a strut bar is to reduce flex these strut towers experience during hard cornering. When taking a turn a car's strut towers normally flex, resulting in body-flex and loss of traction. Consequently, strut bars are designed to keep strut towers from flexing, in that the strut bars take the pressure being applied to one strut tower when taking a turn and distributing that pressure to both strut towers.

This is so because a strut bar is constructed to tie the two strut towers of a car together so that they share the load applied at the outer strut tower. This accords twice as much material [i.e., strut towers] when a strut tower encounters the same cornering forces and helps reduce fatigue stress in this area by "sharing" the forces. This tying [connecting] together of two opposing strut towers reduces a vehicle's chassis flex and body flex. And, as so connected, as a single solid unit, it provides for added stiffness and transmits the load of each strut tower during cornering via tension and compression of the strut bar which shares the load between both strut towers and thereby reduces chassis flex.

Because the tops of such strut towers on cars sit high in the engine compartment, a typical strut bar is a basically linear piece attached to the tops of the struts tying the two together.

In trucks, such cannot be done because the shock and strut towers sit deep and well below the lateral plane of the engine. Consequently, no strut bars are available in the industry of which the applicant is aware. Trucks have shocks inside shock housings having a cap covering and holding this shock therein. The strut bar of this disclosure has a horizontal cross member with a downward extending member on each end of the cross member. At the end of each downward extending member is a mounting member adapted to mount on the housing cap of a truck's shock tower.

Each downward extending member is of a sufficient length to permit the mounting members to affix to the shock tower housing caps. In this regard, the strut bar of this disclosure is easy to install and vastly improves truck road manners, suspension, and its handling characteristics.

The mounting members are fitted to work with the factory suspension components of all types of trucks to thereby fit directly the shock tower of the truck and onto the exposed stud on top of the shock tower whose housing is generally welded to the chassis of the truck. All truck shocks are housed in this type of shock tower with a cap at the upper end of the shock tower. The cap fits over several exposed studs on the upper housing of the shock tower and aids to hold the shock under it in place. The cap is held in place by nuts tightened over the exposed studs.

Mounting the strut bar of this disclosure requires merely removing the nuts from the studs using a conventional tool [crescent wrench, box wrench, open-end wrench, socket wrench, and the like], placing the mounting member onto the studs, and replacing the nuts onto the studs and tightening them thereat. This will securely hold the strut bar of this disclosure.

The improved features of the strut bar of this disclosure include:

a. Directly bolts onto an existing shock tower without modification or special tool requirements.

b. When driving on off-road conditions, allows the existing shock to operate properly.

c. Virtually eliminates body flex and chassis flex.

d. Provides the driver with more linear control and situational control of the truck.

e. Stabilizes cornering; particularly, heavy cornering.

f. Increases structural rigidity of the chassis.

g. Improves overall handling.

h. Creates a more positive steering response.

It is the single or multi-bar [cross member] structure combined with the integrated support brace therebetween, and to some extent the top plate, which greatly improves handling, driveability, and control when properly mounted to shock towers of trucks. The spaces defined at various connection points [pivot space and plate space] allow for some flexibility of the overall strut bar combination.

The foregoing has outlined some of the more pertinent objects of the strut bar of this disclosure. These objects should be construed to be merely illustrative of some of the more prominent features and applications of the strut bar of this disclosure. Many other beneficial results can be attained by applying the disclosed strut bar of this disclosure in a different manner or by modifying the strut bar of this disclosure within the scope of the disclosure. Accordingly, other objects and a fuller understanding of the strut bar of this disclosure may be had by referring to the summary of the strut bar of this disclosure and the detailed description of the preferred embodiment in addition to the scope of the strut bar of this disclosure defined by the claims taken in conjunction with the accompanying drawings.

SUMMARY

The above-noted problems, among others, are overcome by the strut bar of this disclosure. Briefly stated, the strut bar of this disclosure contemplates a strut bar having dual cross members each with downward extensions terminating at a pivot point and mounting member. The mounting members are adapted to fit directly over existing shock towers and strut towers using the studs on the respective towers upon which to attach. A diagonally disposed support brace connected to the cross members and downward extensions along with a top plate on each cross member adds greater structural support for the strut bar and enhanced operability.

The foregoing has outlined the more pertinent and important features of the strut bar of this disclosure in order that the detailed description that follows may be better understood so the present contributions to the art may be more fully appreciated. Additional features of the strut bar of this disclosure will be described hereinafter which form the subject of the claims. It should be appreciated by those skilled in the art that the conception and the disclosed specific embodiment may be readily utilized as a basis for modifying or designing other structures and methods for carrying out the same purposes of the strut bar of this disclosure. It also should be realized by those skilled in the art that such equivalent constructions and methods do not depart from the spirit and scope of the strut bar of this disclosure as set forth in the appended claims.

BRIEF DESCRIPTION OF THE DRAWINGS

For a fuller understanding of the nature and objects of the strut bar of this disclosure, reference should be had to the following detailed description taken in conjunction with the accompanying drawings in which.

DETAILED DESCRIPTION

Figure 1:
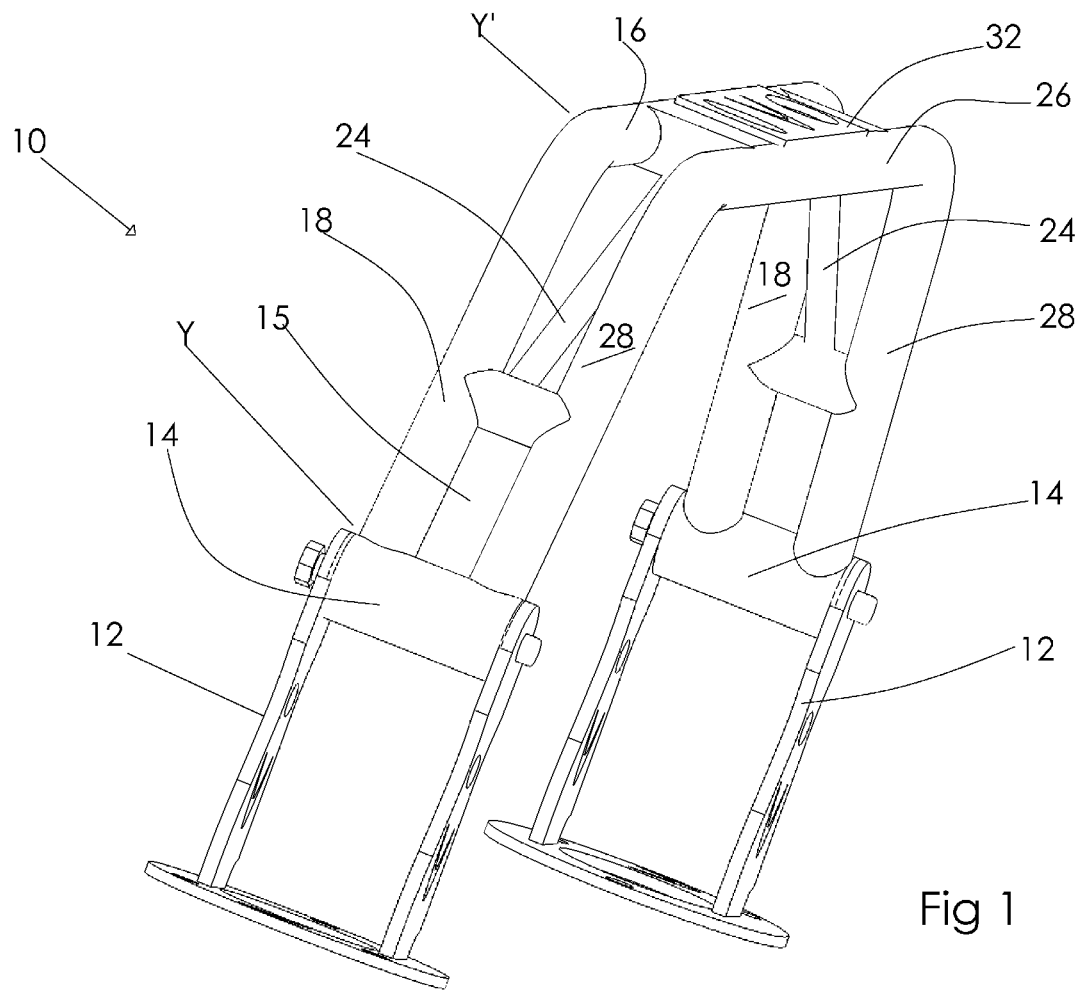
FIG. 1 is a perspective view of the strut bar of the present disclosure as illustrated from one end.
Figure 2:
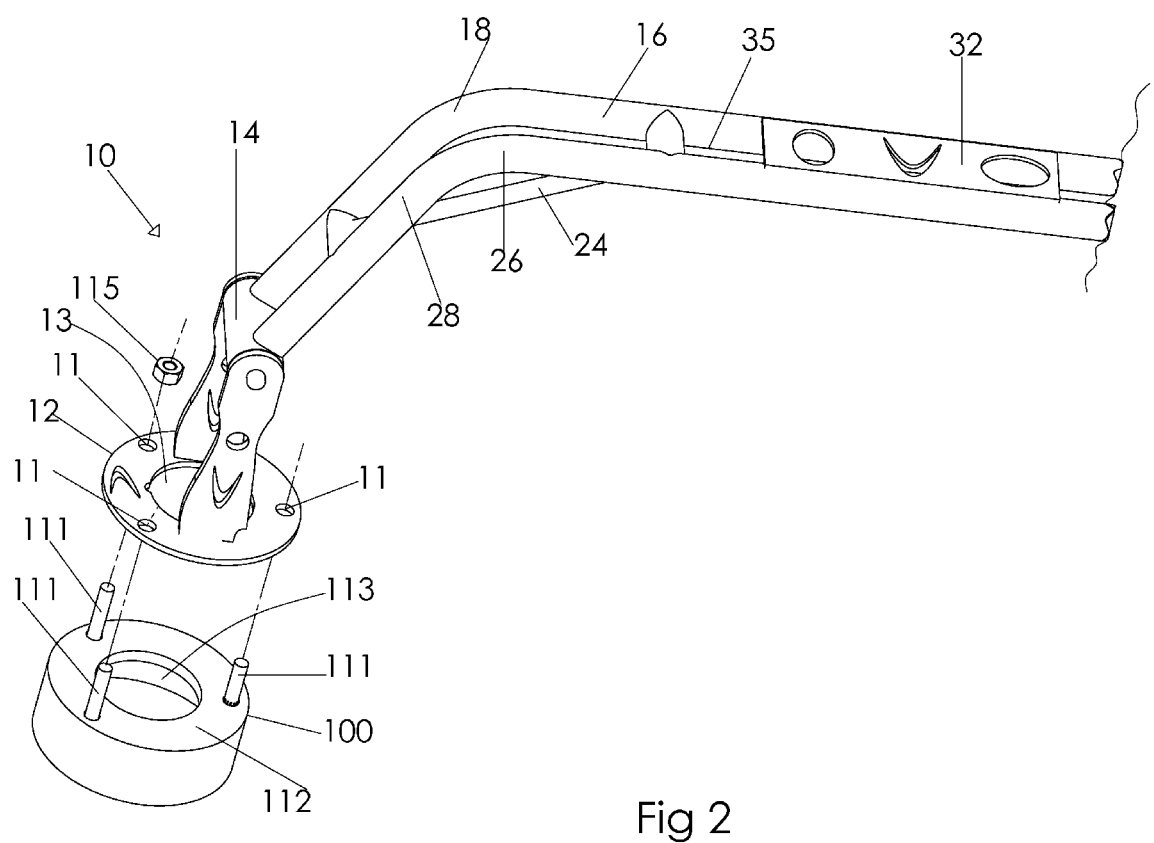
FIG. 2 is a perspective view of the strut bar of the present disclosure as illustrated from the top.
Figure 3:
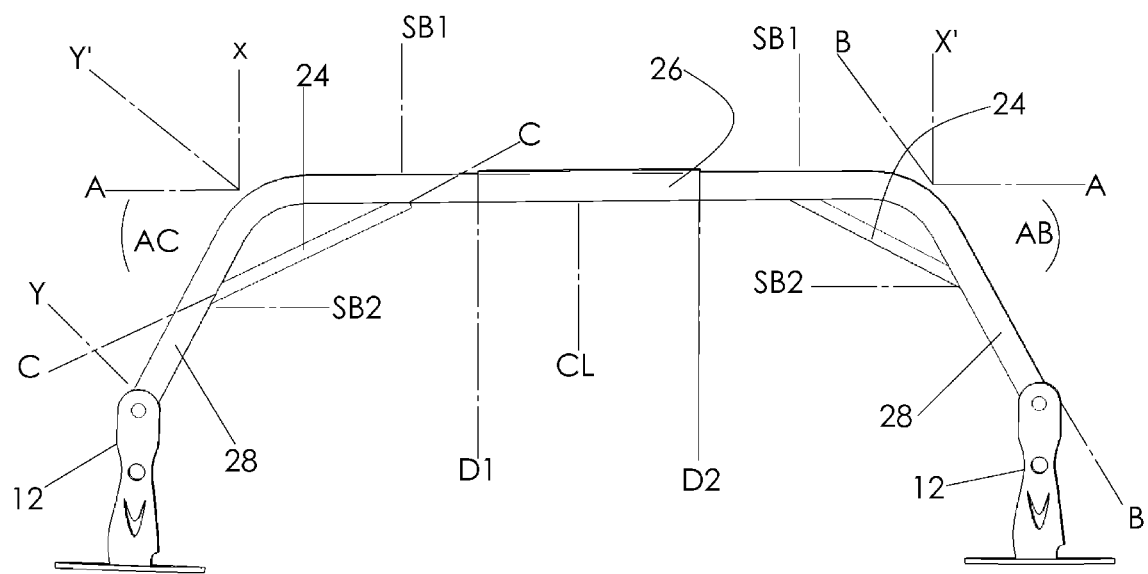
FIG. 3 is a front elevation view of the strut bar of the present disclosure.

Referring now to the drawings in detail and in particular to FIGS. 1 and 2, reference character 10 generally designates a strut bar constructed in accordance with a preferred embodiment of the present disclosure. It has a first cross member 16 and a second cross member 26 with each cross member 16, 26 having at each end a downward extension 18, 28, respectively. As shown in FIG. 3, the horizontal plane of the cross member 16, 26 is represented by reference character A. The downward diagonal plane of the downward extension 18, 28 is represented by reference character B. The angle is represented by reference character AB and can range from about 40° to about 75°. For ideal performance, ease of mounting, and ease of maintenance, angles from about 65° to about 72° are best.

Each downward extension 18, 28 must extend well below the respective cross member 16, 26 and, consequently, well below the uppermost horizontal plane of the vehicle's engine. Typical lengths of the downward extensions 18, 28 will range from about 4-inches to about 20-inches. Typical ranges for most engines will be about 5-inches to about 10-inches.

The end or terminus of each downward extension 18, 28 is attached to a pivot member 14. Attached to the pivot member 14, in pivotable fashion, is the mounting member 12. The mounting member 12 has a central aperture 13 and a plurality of mounting apertures 11. As illustrated in FIG. 2, these respective apertures 11, 13 are adapted to fit over studs 111 and hub 113, respectively, on the shock tower 100 and cap 112 on the housing of the shock tower 100 of a truck. After the mounting apertures 11 are fitted over the studs 111, previously removed nuts 115 are replaced on the studs 111 and tightened.

When the strut bar 10 is mounted to a truck's shock tower 100 in this fashion, and in operation, the mounting member 12 is rigidly affixed to the shock tower which in turn is welded to the chassis. As hard driving is experienced, with flex and sway, this pivotal connection 12, 14, 18, 28 ties the truck's two shocks/struts together in pivotal fashion, and allows for a more even distribution and some absorption of forces encountered in the driving and cornering being executed.

Figure 4:
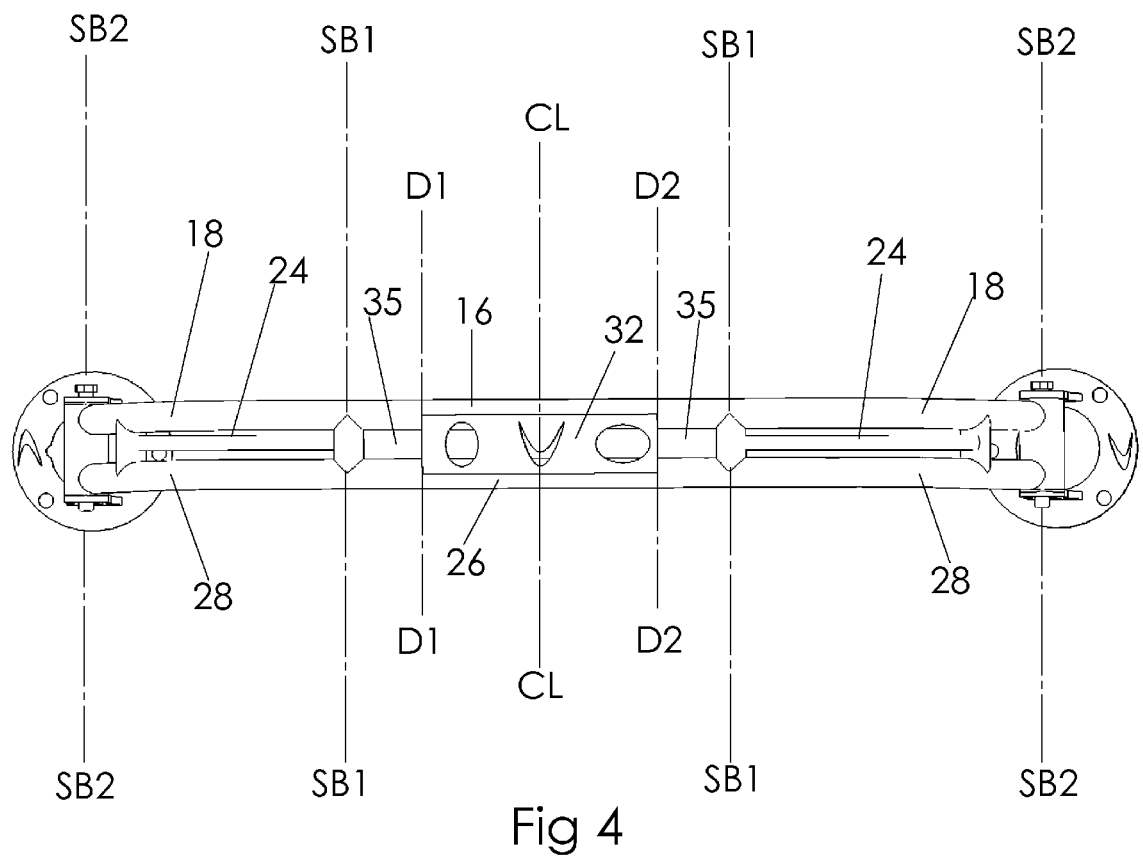
FIG. 4 is a plan top view of the strut bar of the present disclosure.

To enhance the structural integrity of the strut bar 10 and more securely "tie" the two shock/strut towers together for greater operation capability, a support brace 24 is connected at one end [first end or top] to each cross member 16, 26. The connection point is designated as reference character SB1 as illustrated in FIGS. 3 and 4. The second end or bottom of the support brace 16, 26 is connected to each downward extension 18, 28. This connection point is designated as reference character SB2. This connection point SB2 is located above the terminus of each downward extension 18, 28 and below the horizontal plane A of each cross member 16, 26. In this regard, if the length of each downward extension is Y-Y' [as illustrated in FIG. 3] then connection point SB2 is approximately 30-Length % to 70-Length % of Y-Y' as measured from Y'.

As so connected it can be seen that the second end [bottom] of the support brace 24 is connected to each downward extension 18, 28 above and separate from the pivot member 14 and also defines a pivot space 15 therebetween.

A top plate 32 is also connected to each cross member 16, 26 at the approximate center or middle of each cross member 16, 26. The center of each cross member 16, 26 is designated as reference character CL. The top plate 32 extends outward therefrom to end points designated as reference characters D1 and D2; each of which are short of the full distance of each cross member 16, 26.

The first end [or top] of the support brace 24 connects to each cross member 16, 26 adjacent to, but separate from, the end points D1, D2 of the top plate 32 defining a plate space 35 therebetween. The connection points are designated by reference character SB1. The location of SB1 on each cross member 16, 26, as measured from the respective sides of each cross member 16, 26 is approximately 10% to 30% of the entire length of each cross member 16, 26. In this regard, if the length of each cross member 16, 26 is X-X' [as illustrated in FIG. 3] then connection point SB1 is approximately 10-Length % to about 30-Length % inward [toward the center] of X-X'.

For some vehicles, for proper performance and installation and structural integrity, it may be necessary to eliminate the single support brace 24 and to use instead a direct support brace 124 which connects directly to the first cross member 16 and its adjacent downward extension 18 and another direct support brace 124 which connects direction to the second cross member 26 and its adjacent downward extension as illustrated in FIG. 1.

As measured downward from Y', the location of the direct support brace 124 on respective downward extensions 18, 28 is approximately 10-Length % to about 30-Length % of the total distance Y-Y'.

As illustrated in FIG. 3, the downward diagonal position of each support brace 24 in relation to the horizontal plane A of each cross member 16, 26 is designated by reference character C. The downward angle between horizontal plane A and diagonal position C is designated by reference AC. In this regard, AC generally ranges between approximately 20% to about 45%. Best angle for performance, structural integrity, installation, and maintenance is about 30%.

The present disclosure includes that contained in the present claims as well as that of the foregoing description.

Although this strut bar of this disclosure has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the strut bar of this disclosure. Accordingly, the scope of the strut bar of this disclosure should be determined not by the embodiments illustrated, but by the appended claims and their legal equivalents.

Applicant[s] have attempted to disclose all the embodiments of the strut bar of this disclosure that could be reasonably foreseen. It must be understood, however, that there may be unforeseeable insubstantial modifications to strut bar of this disclosure that remain as equivalents and thereby falling within the scope of the strut bar of this disclosure.

What is claimed is:

1. A strut bar comprising:
   (a) at least one cross member having a first downward extension at a first side and a second downward extension at a second side;
   (b) a first direct support brace having a first end and a second end wherein said first end is connected to said cross member and said second end is connected to said first downward extension, and further comprising a second direct support brace having a first end and a second end wherein said first end is connected to said cross member and said second end is connected to said second downward extension; and
   (c) a first mounting member and a second mounting member, each having a top and a bottom, wherein the top of said first mounting member is pivotably connected to said first downward extension and the top of said second mounting member is pivotably connected to said second downward extension and wherein the bottom of each mounting member is adapted to mount onto a shock tower of a truck.

2. The strut bar of claim 1 further comprising a second cross member having a first downward extension at a first side and a second downward extension at a second side, said second cross member adjacent to and spaced apart from said first cross member defining a space therebetween, wherein said first downward extension of said second cross member is pivotably connected to the top of said first mounting member and said second downward extension of said second cross member is pivotably connected to the top of said second mounting member.

3. The strut bar of claim 2 further comprising a top support plate connected over the space between said first cross member and said second cross member.

4. The strut bar of claim 2 wherein said second cross member is connected to said first direct support brace and to said second direct support brace.

5. A strut bar comprising:
   (a) at least one cross member having a first downward extension at a first side and a second downward extension at a second side;
   (b) a pivot member at a distal end of said first downward extension and a pivot member at a distal end of said second downward extension;
   (c) a first mounting member and a second mounting member, each having a top and a bottom, wherein the top of said first mounting member is pivotably connected to the pivot member of said first downward extension and the top of said second mounting member is pivotably connected to the pivot member of said second downward extension and wherein the bottom of each mounting member is adapted to mount onto a shock tower of a truck; and
   (d) a first direct support brace having a first end and a second end wherein said first end is connected to said cross member and said second end is connected to said first downward extension, and further comprising a second direct support brace having a first end and a second end wherein said first end is connected to said cross member and said second end is connected to said second downward extension.

6. The strut bar of claim 5 further comprising a second cross member having a first downward extension at a first side connected at its distal end to said pivot member, and a second downward extension at a second side connected at its distal end to said pivot member, said second cross member adjacent to and spaced apart from said first cross member defining a space therebetween.

7. The strut bar of claim 6 further comprising a top support plate connected over the space between said first cross member and said second cross member.

8. The strut bar of claim 6 wherein said second cross member is connected to said first direct support brace and to said second direct support brace.

* * * * *